April 6, 1954
R. W. HALL ET AL
2,674,394
CLAMP FOR HOLDING SPARE TIRES AND WHEELS
Filed Sept. 15, 1951
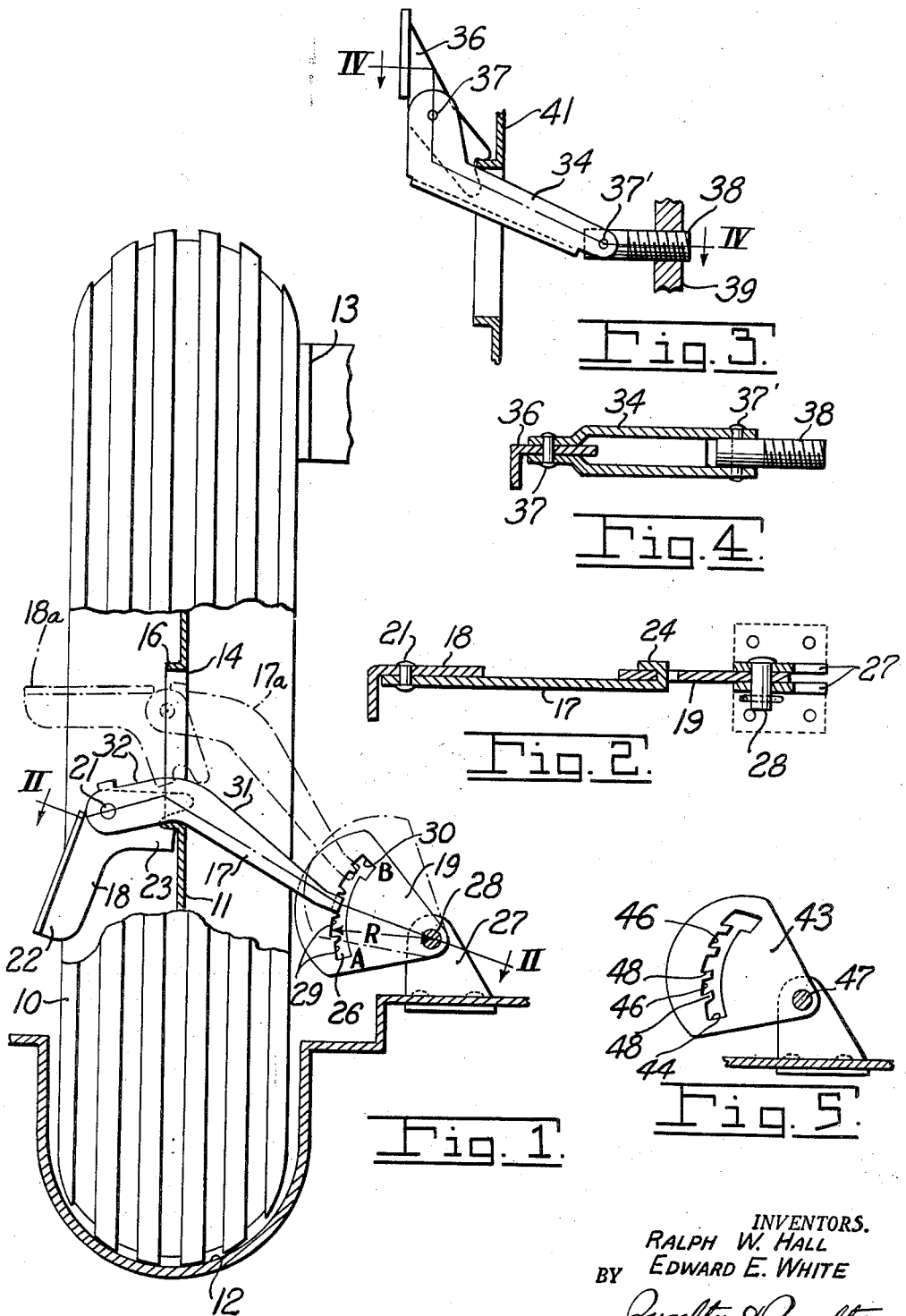
INVENTORS.
RALPH W. HALL
BY EDWARD E. WHITE
Zugelter & Zugelter
Attys.

Patented Apr. 6, 1954

2,674,394

UNITED STATES PATENT OFFICE 2,674,394

CLAMP FOR HOLDING SPARE TIRES AND WHEELS

Ralph W. Hall, Cincinnati, and Edward E. White, Hamilton County, Ohio, assignors to The Randall Company, Cincinnati, Ohio, a corporation of Ohio Application September 15, 1951, Serial No. 246,817

2 Claims. (Cl. 224—42.24)

This invention relates to a clamp for securing the spare tire and wheel of an automobile or the like.

Automobile spare tires and wheels normally are held in place in the trunk compartment by a bolt and nut arrangement which is inconvenient to operate and requires substantial time for operation. An object of this invention is to provide a quick operating clamp which holds the spare tire and wheel firmly in place in its mount but which can quickly and easily be opened to release the tire and wheel or closed to secure the spare tire and wheel in its mount.

The size and inflation of a spare tire may vary during use. A further object of this invention is to provide a clamp which can quickly and easily be adjusted with the size and inflation of the tire to hold the tire in place, both when the tire is fully inflated and when it is partially deflated.

A further object of this invention is to provide a quick operating clamp which engages and grips the spare wheel at the hub opening thereof to secure and hold the spare wheel and tire in place.

The above and other objects and features of the invention will in part be apparent and will in part be obvious from the following detailed description, and the drawing, in which:

Figure 1 is a view, partly in section and partly in side elevation, showing a spare tire and wheel mounted in a vehicle, the spare tire and wheel being held in place by a clamp constructed in accordance with an embodiment of this invention;

Fig. 2 is a view in section taken along a line II—II in Figure 1;

Fig. 3 is a view partly in section and partly in elevation, showing a clamp constructed in accordance with another embodiment of this invention, the clamp being shown in engagement with a wheel, only a fragment of the wheel being shown;

Fig. 4 is a view in section taken along a line IV—IV in Fig. 3; and

Fig. 5 is a view partly in side elevation and partly in section, showing a sector plate which forms a part of a clamp constructed in accordance with another embodiment of this invention;

In the following detailed description and the drawing, like reference characters indicate like parts.

In Fig. 1, are shown a spare tire 10 and wheel 11 on its mount in a compartment of a car. Spare tire 10 rests in a trough 12. The top of the tire abuts a bracket or abutment 13. Trough 12 and abutment 13 usually form a part of the appointments of the trunk compartment of an automobile body.

Wheel 11 is provided with the usual central hub opening 14, at the margin of which is an annular flange or rim 16.

The tire 10 and wheel 11 are held in place by a clamp which includes a main link 17, a latch lever 18, and an adjustable sector link or plate 19. Main link 17 extends through the hub opening of the wheel. Latch lever 18 is preferably of L-shape and is pivotally attached at the knee thereof to one end of the link 17 by a pin 21. One arm 22 of the latch lever forms a handle, while the other arm 23 thereof has a jaw engageable with flange 16 of the wheel 11.

As shown, main link 17 is provided with a hook 24 at the end thereof remote from pivot pin 21. Hook 24 extends through an opening or slot 26 in sector plate 19 and engages one side of slot 26.

Sector plate 19 is pivotally mounted on a bracket 27 that is attached to the vehicle. Slot 26 is arcuate but not concentric with the pivot 28 of plate 19, as the radius R increases in length between points A and B at opposite ends of the slot. The side of the opening engaged by hook 24 is provided with a plurality of spaced notches 29 in which the hook 24 is received. The distance from pivot 28 to the base of the respective notches between points A and B increases so that the effective length of the link comprising plate 19 and main link 17 may be adjusted by moving hook 24 from one notch to another. As shown in Fig. 1, the upper end of slot 26 is enlarged as indicated at 30 to facilitate removal of the hook from slot 26, if desired. The notches below the upper end of slot 26 are sufficiently narrow that the hook can not be removed from slot 26 unless it is in the enlargement.

As shown in Fig. 1, main link 17 is of L-shape and hook 24 is at the inner end of arm 31 thereof. The end of outer arm 32 carries pivot 21. Outer arm 32 is of substantially the same length as the jaw carrying arm of latch lever 18 so that, when the latch lever is advanced to the position shown in full lines in Fig. 1, jaw 23 engages the flange at the hub opening of the wheel, and holds the flange against the central portion or bend of the main link. When the spare tire and wheel are to be released, latch lever 18 is swung to the position shown in dot-dash lines at 18a to release the wheel. Then, the wheel and tire can be moved to the left with the hub opening of the wheel passing over the main link and latch lever.

The clamp can quickly and easily be opened or closed to release or clamp the spare tire and wheel. When the clamp is closed, the spare tire and wheel are firmly held in place. If it is found that greater or lesser tension on the clamp is required, hook 24 can be moved along the slot in sector plate 19 to whichever position gives the desired clamping pressure.

In Figs. 3 and 4 is shown a clamp which includes a main link 34 and a latch lever 36. Latch lever 36 is pivoted at 37 to one end of main link 34. The other end of main link 34 is formed into a clevis, as shown in Fig. 4, and is pivotally connected by a pivot pin 37' to the head of a stud 38. Stud 38 is threaded into a vehicle frame member 39, only a portion of which is shown. The clamp illustrated in Figs. 3 and 4 operates in the same manner as does the clamp shown in Figs. 1 and 2. When the clamp is in the position shown in Fig. 3, a wheel 41 is clamped firmly in place. When it is desired to release the wheel, latch lever 36 is swung counterclockwise upon its pivot to cause the clamp to be released. If the clamping pressure needs to be increased or decreased, the clamp and stud can be turned to advance the pivot pin 37' toward or away from frame member 39 to adjust the tightness of the clamp.

In Fig. 5 is shown a sector plate 43. Sector plate 43 may be substituted for the sector plate shown in Figs. 1 and 2. Sector plate 43 is provided with an arcuate slot 44 having notches 46 along the edge thereof opposite the pivot 47. The notches are defined by teeth 48. Teeth extend generally toward the pivot 47 but also upwardly thereof, so that the teeth are adapted to hold the hook of a main link even when tension on the clamp is released to keep the hook from falling to the bottom of slot 44.

Each of the clamps shown in the drawing and described above, firmly holds a spare tire and wheel in its mount but can quickly and easily be released to permit removal of the spare tire and wheel.

From the foregoing it will be apparent to those skilled in this art, that various modifications and changes may be made in the illustrated embodiments of the invention without departing from either the spirit or the scope thereof.

Having thus described our invention what we claim as new and desire to secure by Letters Patent is:

1. A clamp for holding a vehicle spare tire and wheel which comprises a flat sector plate, means for pivotally connecting said plate to the framework of the car to swing in a vertical plane, an elongated segmental slot in said plate extending arcuately around the pivot means, the slot being upright, a plurality of teeth extending along the edge of the slot remote from the pivot means and projecting toward the pivot means and upwardly, said teeth defining a plurality of notches, the notches being spaced progressive distances from the pivot means, an L-shaped main link, a hook at the free end of one of the arms of the main link extending through the slot in the plate and selectively engageable with said notches, the other arm of the main link projecting through the central opening of the wheel, there being a flange around the central opening of the wheel, a latch lever pivotally attached to the free end of the other arm of the main link, said latch lever having a handle arm and a latch arm extending on opposite sides of the pivot of the latch lever, the latch arm being of substantially the same length as said other arm of the lever and terminating in a jaw engageable with the flange of the wheel, the jaw engaging the flange of the wheel to hold the flange against the bend of the main link to clamp the spare tire and wheel in its mount.

2. A clamp for holding a vehicle spare tire and wheel which comprises a flat plate, means for pivotally attaching said plate to the framework of the vehicle, there being an elongated slot in said plate spaced from said plate pivot means and extending arcuately around the plate pivot means, a plurality of teeth spaced along the edge of the slot remote from the plate pivot means to define a plurality of notches along said edge, the distance from the plate pivot means to said edge increasing by predetermined increments from notch to notch along the slot, an L-shaped main link, means at one end of the main link extending through the slot and selectively engageable with the notches, the opposite end of the main link being adapted to extend through the hub opening of the wheel, and a latch lever pivotally attached to said opposite end of the main link, said latch lever having a jaw engageable with the wheel at the rim of said hub opening to clamp the rim against the main link and secure the spare tire and wheel on its mount.

References Cited in the file of this patent

UNITED STATES PATENTS

| Number | Name | Date |
| --- | --- | --- |
| 1,506,833 | Higginbotham | Sept. 2, 1924 |
| 1,603,527 | Fagan | Oct. 19, 1926 |
| 1,883,032 | Smith | Oct. 18, 1932 |
| 1,931,080 | Nehls | Oct. 17, 1933 |

FOREIGN PATENTS

| Number | Country | Date |
| --- | --- | --- |
| 404,602 | France | Oct. 23, 1909 |
| 934,228 | France | Jan. 10, 1948 |